United States Patent
Hammer et al.

(10) Patent No.: US 9,855,914 B1
(45) Date of Patent: Jan. 2, 2018

(54) DEFORMABLE ENERGY ABSORBER STRUCTURES FOR FRONT HOOD ASSEMBLIES OF VEHICLES

(71) Applicant: Toyota Motor Engineering & Manufacturing North America, Inc., Erlanger, KY (US)

(72) Inventors: Jeremiah T. Hammer, Ann Arbor, MI (US); Aaron R. Steinhilb, Milan, MI (US); Avinash S. Phadatare, Canton, MI (US); Rahul B. Gururaj, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/205,208

(22) Filed: Jul. 8, 2016

(51) Int. Cl.
  *B62D 21/15* (2006.01)
  *B60R 21/34* (2011.01)
  (Continued)

(52) U.S. Cl.
  CPC ........... *B60R 21/34* (2013.01); *B60R 19/023* (2013.01); *B60R 19/483* (2013.01); *B60W 30/08* (2013.01); *B60W 30/14* (2013.01); *B62D 21/15* (2013.01); *G08G 1/16* (2013.01); *B60R 2021/003* (2013.01); *B60R 2021/343* (2013.01); *B60W 2422/90* (2013.01); *B60Y 2300/08* (2013.01); *B60Y 2300/14* (2013.01)

(58) Field of Classification Search
  CPC .............................. B62D 21/15; B62D 21/152
  USPC .................... 296/187.09; 180/68.6, 167, 232
  See application file for complete search history.

(56) References Cited

U.S. PATENT DOCUMENTS 4,413,702 A * 11/1983 Schlanger ............... B60R 19/32
                                                180/274
5,096,223 A * 3/1992 Tekelly ................. B60R 21/045
                                                280/748
(Continued)

FOREIGN PATENT DOCUMENTS

DE       102013018323 A1    4/2015
EP            2599666 A1    6/2013
(Continued)

OTHER PUBLICATIONS

Pedestrian Testing Protocol, European New Car Assessment Programme (Euro NCAP), Version 8.0, Jun. 2014, available at: http://s3.amazonaws.com/cdn.ancap.com.au/app/public/assets/ad51e8bebc9619a35d6909cf2b2c086943df6de1/original.pdf?1417518853.

*Primary Examiner* — Jeffrey J Restifo
(74) *Attorney, Agent, or Firm* — Dinsmore & Shohl LLP

(57) ABSTRACT

A front hood assembly for a vehicle including a front grille may include a sensory assembly, a bumper assembly positioned adjacent to the front grille, and an energy absorber structure. The bumper assembly may include a bumper reinforcement having a front face and a top face, which front face is disposed below and extends away from the top face. The energy absorber structure may be positioned adjacent to the top face of the bumper reinforcement. The energy absorber structure may be rearwardly compliant in an impact direction and disposed below and rearwardly of the sensory assembly such that an impact of the sensory assembly with the energy absorber structure in the impact direction collapses the energy absorber structure rearwardly.

20 Claims, 9 Drawing Sheets

(51) Int. Cl.
  *B60R 19/02*   (2006.01)
  *B60R 19/48*   (2006.01)
  *B60W 30/08*   (2012.01)
  *B60W 30/14*   (2006.01)
  *G08G 1/16*    (2006.01)
  *B60R 21/00*   (2006.01)

(56) References Cited

U.S. PATENT DOCUMENTS

| | | | | |
|---|---|---|---|---|
| 5,326,133 A * | 7/1994 | Breed | ............... | B60R 19/483 |
| | | | | 180/274 |
| 5,441,301 A * | 8/1995 | Breed | ............... | B60J 10/00 |
| | | | | 180/274 |
| 6,557,889 B2 * | 5/2003 | Breed | ............... | B60J 10/00 |
| | | | | 280/735 |
| 7,137,472 B2 * | 11/2006 | Aoki | ............... | B60R 21/0136 |
| | | | | 180/274 |
| 7,455,351 B2 * | 11/2008 | Nakayama | ............... | B60R 19/52 |
| | | | | 180/68.6 |
| 7,954,866 B2 * | 6/2011 | Barcomb | ............... | B60R 19/02 |
| | | | | 293/102 |
| 8,251,438 B2 * | 8/2012 | Linden | ............... | B60K 11/04 |
| | | | | 180/68.4 |
| 8,403,391 B2 * | 3/2013 | Steinhilb | ............... | B62D 25/163 |
| | | | | 296/187.03 |
| 8,485,295 B2 * | 7/2013 | Mildner | ............... | B62D 25/084 |
| | | | | 180/68.1 |
| 8,672,067 B2 * | 3/2014 | Ajisaka | ............... | B60H 1/00535 |
| | | | | 165/41 |
| 8,733,485 B2 * | 5/2014 | Hilmann | ............... | B62D 21/152 |
| | | | | 180/68.4 |
| 8,944,495 B2 * | 2/2015 | Tsuneyama | ............... | B62D 25/163 |
| | | | | 296/193.09 |
| 9,527,531 B2 * | 12/2016 | Waskie | ............... | B60R 21/34 |
| 9,598,114 B2 * | 3/2017 | Steinhilb | ............... | B60R 21/34 |
| 9,630,581 B2 * | 4/2017 | Hammer | ............... | B60R 19/34 |
| 2001/0000886 A1 * | 5/2001 | Breed | ............... | B60J 10/00 |
| | | | | 180/274 |
| 2006/0064845 A1 * | 3/2006 | Fujii | ............... | B60R 21/34 |
| | | | | 16/82 |
| 2013/0249243 A1 * | 9/2013 | Lee | ............... | B62D 21/152 |
| | | | | 296/187.03 |

FOREIGN PATENT DOCUMENTS

| | | |
|---|---|---|
| JP | H10123248 A | 5/1998 |
| JP | 2006272988 A | 10/2006 |
| JP | 2009287950 A | 12/2009 |
| JP | 2013001227 A | 1/2013 |
| JP | 2015140029 A | 8/2015 |

* cited by examiner

DEFORMABLE ENERGY ABSORBER STRUCTURES FOR FRONT HOOD ASSEMBLIES OF VEHICLES

TECHNICAL FIELD

The present specification generally relates to front hood assemblies for vehicles and, more specifically, to front hood assemblies for vehicles with deformable energy absorber structures for the front hood assemblies.

BACKGROUND

Vehicles may be equipped with front hood assemblies including bumper assemblies and a front grille. Various organizations are introducing a number of pedestrian regulations and rating criteria for automotive vehicles including such front hood assemblies, and a number of standards and tests currently exist. As one example, test methods have been developed to assess the protection of an adult pedestrian by simulating upper leg impact conditions during a car-to-pedestrian impact. Generally, under such testing conditions, impact upon a front hood assembly is tested and force absorption and a bending moment experienced by an impactor that is representative of an upper part of the leg are measured. In the front hood assemblies, structural components within the bumper assembly and in a direction of impact may increase the bending moment upon impact due to, for example, a resultant contact with an interior bumper assembly structure. Accordingly, alternative front hood assemblies are desired.

SUMMARY

In embodiments, a front hood assembly for a vehicle including a front grille may include a sensory assembly, a bumper assembly positioned adjacent to the front grille, and an energy absorber structure. The bumper assembly may include a bumper reinforcement having a front face and a top face, and the front face is disposed below and extends away from the top face. The energy absorber structure may be positioned adjacent to the top face of the bumper reinforcement. The energy absorber structure may be rearwardly compliant in an impact direction. The energy absorber structure may be disposed below and rearwardly of the sensory assembly such that an impact of the sensory assembly with the energy absorber structure in the impact direction collapses the energy absorber structure rearwardly.

In one embodiment, a vehicle may include a front hood assembly, a bumper assembly, and an energy absorber structure. The front hood assembly may include a sensory assembly. The bumper assembly may include a bumper reinforcement having a front face and a top face, and the front face is disposed below and extends away from the top face. The energy absorber structure may be positioned adjacent to the top face of the bumper reinforcement. The energy absorber structure may be rearwardly compliant in an impact direction. The energy absorber structure may be disposed below and rearwardly of the sensory assembly such that an impact of the sensory assembly with the energy absorber structure in the impact direction collapses the energy absorber structure rearwardly.

In another embodiment, an energy absorber structure for a bumper assembly of a vehicle may include an injection moldable material, a front portion, a middle portion, and rear portion, and one or more bendline structures in the rear portion. The energy absorber structure may be formed from the injection moldable material. Each bendline structure may be defined by a pair of legs defining a gap therebetween, wherein the pair of legs are configured to bend rearwardly at a rearward bend point upon impact at a direction that is angled with respect to an impact direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

During a pedestrian impact with a vehicle, an upper leg of the pedestrian may contact a front hood edge area of a vehicle's front hood assembly. Components such as sensors within the front hood edge area may affect absorption of impact energy through a reduction of local deformation along the front hood edge area due to contact with an underlying structure, such as a bumper reinforcement. Such contact may elevate levels of impact load and impact bending moment to above respective thresholds. The energy absorber structures described in embodiments herein absorb and redistribute such impact energy such that the levels of impact load and impact bending moment may remain below the respective thresholds. Such energy redistribution may result in a potentially increased negative acceleration of an impactor body, and an increase of local deformation of the front hood edge area.

Figure 3:
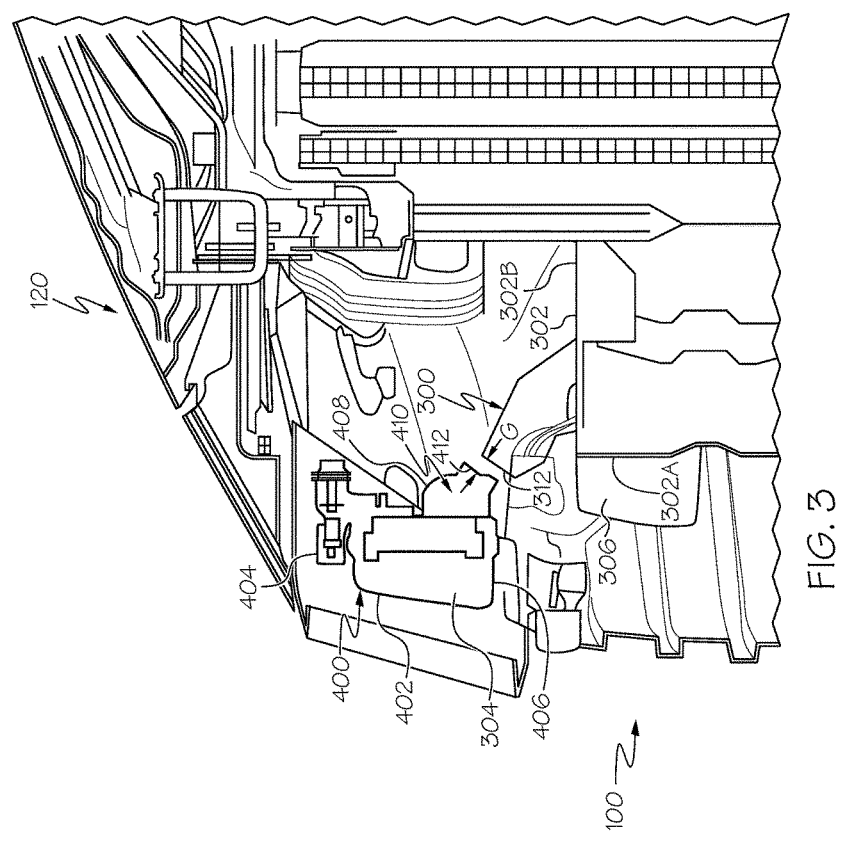
FIG. 3 schematically depicts a cross-section of a side view of the front hood assembly of FIG. 2, according to one or more embodiments shown and described herein.

In the embodiments described herein, the −x direction of the coordinate axes in the figures refers to a length direction. The +/−z direction of the coordinate axes in the figures refers to a vertical direction. The +/−y direction of the coordinate axes in the figures refers to a width direction. Reference will now be made in detail to embodiments of energy absorber structure(s), examples of which are illustrated in the accompanying drawings. Whenever possible, the same reference numerals will be used throughout the drawings to refer to the same or like parts. One embodiment of energy absorber structure(s) is depicted in FIG. 3. Various embodiments of the energy absorber structure(s) will be described in more detail herein.

Figure 1:
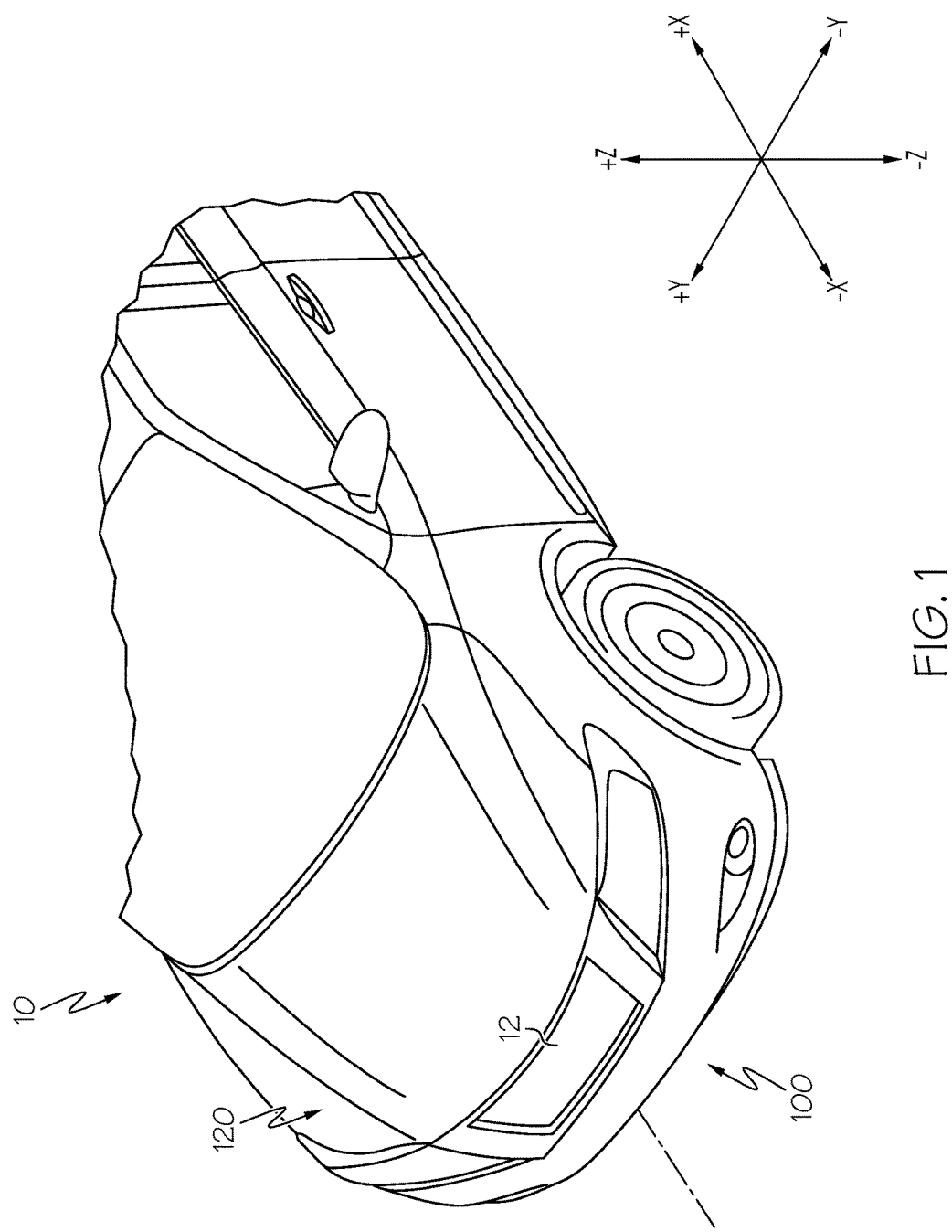
FIG. 1 schematically depicts a front end perspective view of a vehicle with a front hood assembly positioned at a front of the vehicle, according to one or more embodiments shown and described herein.
Figure 2:
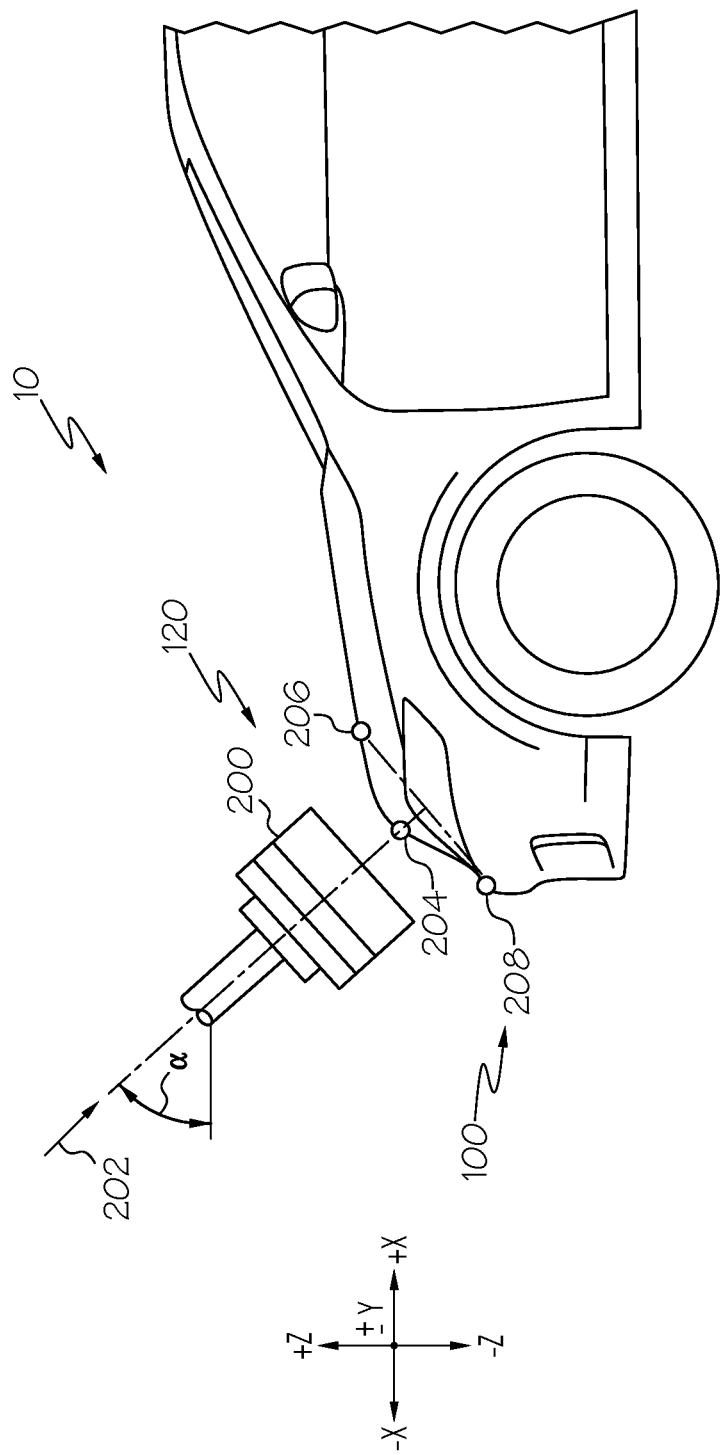
FIG. 2 schematically depicts a side view of the front hood assembly of FIG. 1 and an exemplary impactor prior to impact, according to one or more embodiments shown and described herein.

Referring now to FIG. 1, a front, perspective view of a vehicle 10 is schematically depicted. The vehicle 10 includes a front hood assembly 120 at a front end portion. The front hood assembly 120 includes a front grille 12 and a bumper assembly 100 coupled to and extending in a width direction of the front of the vehicle 10. Referring to FIG. 2, during a pedestrian impact with a vehicle, such as with the vehicle 10, an upper leg of the pedestrian (i.e., the pelvic/femur area) may contact a hood edge area of a front hood assembly 120 that includes the bumper assembly 100 at approximately contact point 204 (FIG. 2), which may be referenced as WAD 775 mm or rather a wrap around distance ("WAD") of 775 mm. WAD means, for example, a distance from a ground surface to a point on the front hood assembly 120 following a geometric, straight line tracing upwardly along the front of the vehicle 10. For example, point 206 is disposed above the contact point 204 and may be referenced as WAD 930 mm (i.e., a wrap around distance at 930 mm). Further, point 208 may be referenced as an IBRL point (i.e., an internal bumper reference line along, for example, an upper bumper contact point) as applied within EURO NCAP impact testing procedures, for example. Testing procedures may include those provided by protocols available and published by EURO NCAP.

Regulatory bodies may measure such impact through a test utilizing an impactor 200, for example. Continuing to refer to FIG. 2, such an impactor 200 is depicted prior to impact with the vehicle 10. The impactor 200 may be used to provide measurements of an overall force (load) as well as a bending of the impactor 200 (i.e., representative of a surrogate upper leg/femur bone). For example, measurements may be calculated and/or generated at least partially based on strategically placed impactor 200 sensors. The force (load) may be measured between top and bottom portions of the impactor 200 (i.e., representing the surrogate femur bone), and the bending moment may be measured at three locations along and against an associated bending of the impactor 200. During testing of impact between the impactor 200 and the vehicle 10, a reduction in measured load and bending moments over the impact period may correspond to an increased negative acceleration of the impactor 200 such that, for example, the impactor 200 slows down during impact, while local deformation of the front hood assembly 120 is increased.

In embodiments, with respect to the impact testing procedure for upper leg impact testing, an angle of impact a and a velocity of the impactor 200 may depend on a styling geometry of the impactor 200. The angle of impact a may be in a range of from about 0 degrees to about 45 degrees with respect to a longitudinal axis along an impact direction 202 of the impactor 200 with respect to the contact point 204 of the vehicle 10. The velocity may be in a range of from about 19.7 kph to about 33.6 kph.

During impact testing, sensory assemblies and/or structural components may limit a stroke of the impactor 200. Such components may undergo contact situations during impact that may prevent a greater reduction of force and bending moment than would occur otherwise without the obstructing components. Thus, such components may increase a positive acceleration of the impactor 200 (i.e., reducing a negative acceleration of the impactor 200 such that the impactor 200 goes faster while increasing its rate of change of velocity). This result may correspond to a reduction in the local deformation of the front hood assembly 120 and thus less absorption of impact energy.

Referring now to FIG. 3, the front hood assembly 120 generally includes at least one energy absorber structure 300 and a sensory assembly 304. The bumper assembly 100 generally includes a bumper reinforcement 302. The bumper reinforcement 302 includes a front face 302A, a top face 302B, and may include a foam component 306 that attached adjacent to the front face 302A of the bumper reinforcement 302 and has a top surface generally aligned with or disposed slightly above the top face 302B of the bumper reinforcement 302.

In the embodiments described herein, the bumper reinforcement 302 of the bumper assembly 100 is supported by front side members of the vehicle 10. The front side members generally extend in the longitudinal +/−x direction beneath the body panels (e.g., the front fenders) of the vehicle 10. The bumper reinforcement 302 is connected to the front side members at bumper beam connecting locations that are spaced-apart from one another in a width direction of the vehicle 10. During a front impact, the bumper reinforcement 302 directs loads incident on the bumper assembly 100 into the front side members. In embodiments, the bumper reinforcement 302 is made of a thick aluminum and/or a like material, is rigid, and includes a main frame length (i.e., the length of the bumper reinforcement in the width direction) of about 3 feet to about 4 feet.

In embodiments, and as will be described in greater detail further below, the sensory assembly 304 may have similar dimensions to the energy absorber structure 300. Further, there may be a gap G in the range of from about 0 mm to about 5 mm between the sensory assembly 304 and the energy absorber structure 300. As a non-limiting example, there may be a limited gap or no spacing between the sensory assembly 304 and the energy absorber structure 300. For example, the sensory assembly 304 and the energy absorber structure 300 may be connected by a fastener such as a foam piece, clip, bolt, screw, or like component, to allow for a more immediate absorption of energy by the energy absorber structure 300 during impact.

As shown in FIG. 3, the sensory assembly 304 includes a housing 400. The housing 400 includes a front end 402 facing toward a front of the vehicle 10, an upper end 404, a lower end 406, and a rear end 408 facing in an opposite direction from the front end 402. The upper end 404 of the housing 400 may attach the sensory assembly 302 to the vehicle 10 through fasteners, which may be bolts, screws, plastic attachments, and/or the like. The rear end 408 includes a projecting portion 410 that has a rear-most wall 412. The rear-most wall 412 is spaced away from a front-most wall 312 of the energy absorber structure 300 by the gap G. During impact, the rear-most wall 412 of the housing 400 of the sensory assembly 304 will move in the impact direction 202 toward the front-most wall 312 of the energy absorber 300, as described herein and in greater detail further below.

Such sensory assemblies 304 (FIG. 3) may be millimeter-wave radar sensors received in a front grille area of a vehicle 10 and utilized for pre-crash sensing guidance and/or dynamic cruise control assistance. For example, the radar sensor(s) may be configured to generate object sensing signals to prevent crashes and/or control signals to assist with dynamic cruise control operations. The radar sensor(s) may be placed in locations in which the impactor 200 may directly or indirectly contact the sensor(s) during impact. Thus, such sensor(s), while important to vehicle operations, may adversely increase positive acceleration of the impactor 200 and reduce local deformation of the front hood assembly 120 during testing, particularly when such sensors are involved in a contact with structural components of the vehicle 10 during the impact, as will be described in greater detail below.

In the embodiments described herein, an energy absorber structure 300 provides for a controlled energy absorption during such impact. Such controlled energy absorption may increase local deformation of the front hood assembly 120 to absorb more impact energy from, and potentially increase a negative acceleration of, the impactor 200 over values that may otherwise occur without the presence of such energy absorber structure(s) 300. While a single energy absorber 300 is described in the examples herein, multiple energy absorber(s) 300 may be utilized with respect to one or more sensory assemblies 304.

In embodiments, the energy absorber structure 300 may be a bracket formed from an injection moldable material, such as an injection moldable polymer material. In embodiments, the energy absorber structure 300 may be a bracket and may be made of a sheet metal such as aluminum and/or stainless steel. Alternatively, the bracket may be made of a plastic, such as a thermoplastic including, for example, polypropylene, polystyrene, ABS (acrylonitrile butadiene styrene) and/or a like material. The bracket may be welded (i.e., at lower ends or leg structure portions) to the bumper reinforcement 302 or attached by other methods, such as through use of fasteners, plastic components, riveting components, adhesives and/or epoxy components. In embodiments, bracket shapes, sizes, and/or bendline locations may be different from those shown herein, for example, and customized for a tuning with respect to impact timing and/or a force requirement for a particular situation.

Figure 4:
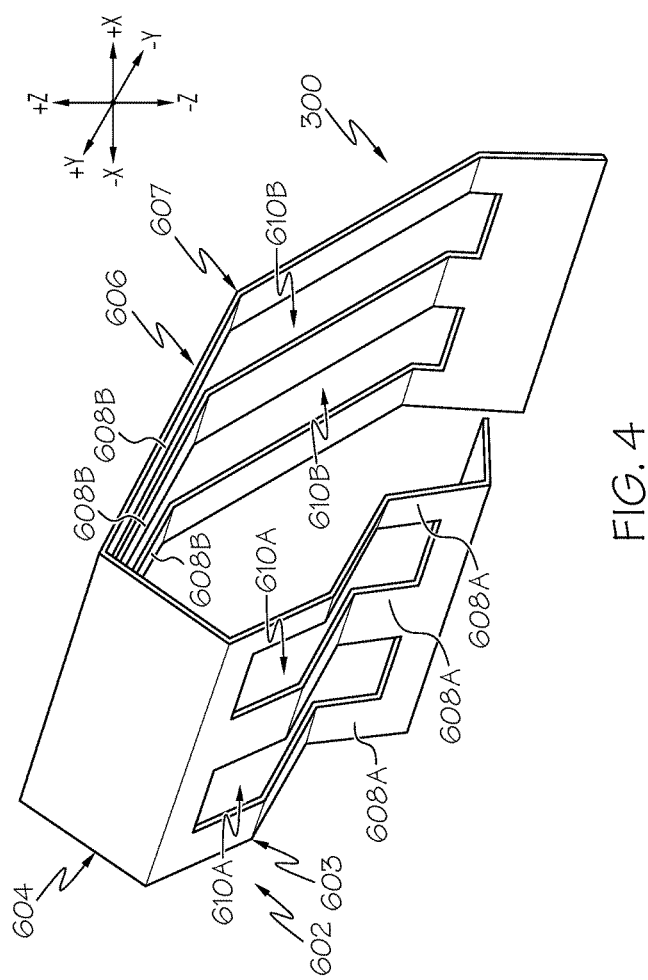
FIG. 4 schematically depicts an exemplary deformable absorber structure prior to impact and collapse, according to one or more embodiments shown and described herein.
Figure 6:
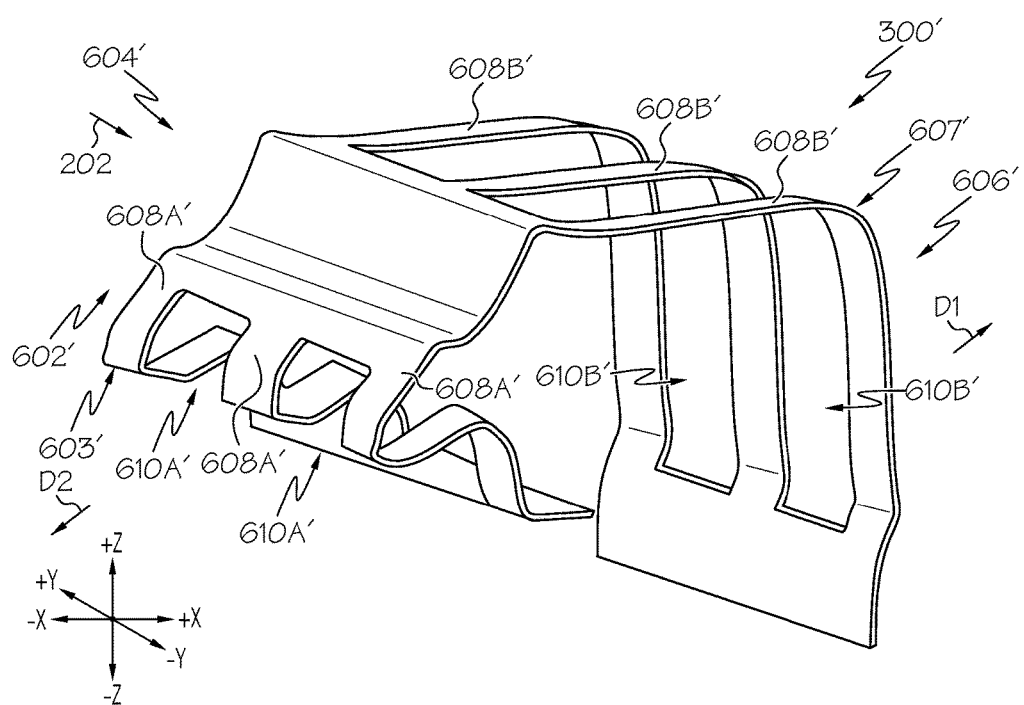
FIG. 6 schematically depicts the exemplary deformable absorber structure of FIG. 4 after impact and collapse, according to one or more embodiments shown and described herein.

Referring to FIG. 4, an example energy absorber structure 300 is shown in an underformed state prior to impact, as described herein. In embodiments, prior to deformation, the energy absorber structure 300 includes a front portion 602, a middle portion 604, and rear portion 606. The middle portion 604 is angled to face the impact direction 202 (FIG. 2) and receive the brunt of the impact and be a contact surface and point with respect to the sensory assembly 304. Upon impact, the middle portion 604 curves and deforms inwardly, while the front and rear portions 602, 606 curve and deform outwardly, as shown in FIG. 6, which illustrates the energy absorber structure 300' in a deformed state after impact and will be described in greater detail below.

Referring again to FIG. 4, the energy absorber structure 300 includes one or more bendline structures in the rear portion 606 that are each defined by a pair of legs 608B defining a gap 610B therebetween. In embodiments, the energy absorber structure 300 may be a bracket and/or may include leg structures configured to be fastened or otherwise attached to the top face 302B of the bumper reinforcement 302. In further embodiments, the energy absorber structure 600 may include one or more bendline structures in the front portion 602. Each bendline structure of the front portion 602 is defined by a pair of legs 608A defining a gap 610B therebetween. As will be described in greater detail below with respect to FIG. 6, the pair of legs 608B are configured to bend at a rearward bend point 607, and the pair of legs 608A are configured to bend at a forward bend point 603.

In embodiments, the energy absorber structure 300 may be a bracket that includes arch structures rather than bend points with respect to the bendline structures, allowing for buckling along an arch rather than at a bend point. Further, in embodiments, the bracket may include a rear portion 606 and/or a front portion 602 having a single leg defining an aperture along a buckling line (i.e., a bendline) to aid with buckling.

Figure 5:
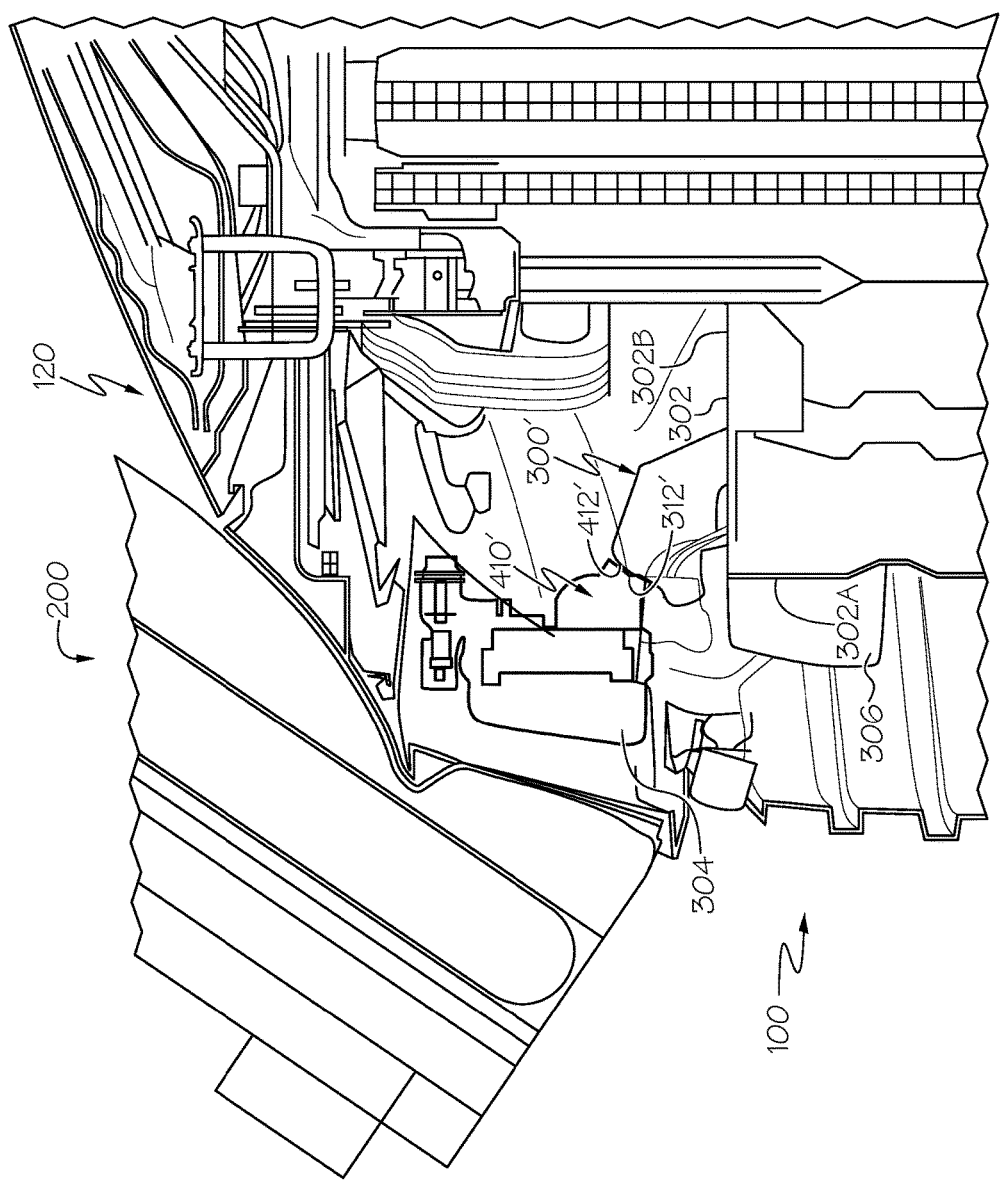
FIG. 5 schematically depicts the cross-section of the side view of the front hood assembly of FIG. 3 and the exemplary impactor of FIG. 2, after impact with the front hood assembly, according to one or more embodiments shown and described herein.

FIG. 5 schematically depicts the cross-section of the side view of the vehicle 10 and the impactor 200 after impact with the front hood assembly 120 of the vehicle 10. As described above and shown in FIG. 5, the front hood assembly 120 includes the front grille 12 (FIG. 1), the sensory assembly 304, the bumper assembly 100 positioned adjacent the front grille 12, and the energy absorber structure 300. In further embodiments, the vehicle 10 may include the front hood assembly 120 including the sensory assembly 304, the bumper assembly 100 including the bumper reinforcement 302, and the energy absorber structure 300 as described herein. As described above, the bumper reinforcement 302 has a front face 302A and a top face 302B, where the front face 302A is disposed below and extends away from the top face 302B. As shown in FIG. 5, the energy absorber structure 300 is positioned adjacent to the top face 302B of the bumper reinforcement 302 and is disposed below and rearwardly of the sensory assembly 304. In embodiments, an impact direction 202 (FIG. 2) is disposed at approximately a 45° angle with respect to a portion of the top face 302B of the bumper reinforcement 302. The energy absorber structure 300 is rearwardly compliant in the impact direction 202 such that an impact of the sensory assembly 304 with the energy absorber structure 300 in the impact direction 202 collapses the energy absorber structure 300 rearwardly (as shown by a deformed energy absorber structure 300' in FIG. 5).

Referring to FIG. 6, the energy absorber structure 300' is shown in a deformed state after impact. Additionally, the difference between the prime (') numbering (i.e., energy absorber structures 300, 300') with respect to FIG. 6 as compared to FIG. 4, as well as for other components described and illustrated herein, indicates an deformed and/or impacted state of a component with such prime numbering (i.e., as compared to an undeformed, pre-impact state for the same component without the prime numbering, as shown, for example, in FIG. 4). The pair of legs 608B of FIG. 4 are configured to bend at a rearward bend point 607 upon impact at a direction D1 (FIG. 6, bend point 607') that is rearwardly (and outwardly, i.e., away from the middle portion 604) angled with respect to the impact direction 202. Further, the pair of legs 608A of FIG. 4 are configured to bend forwardly (and outwardly, i.e., away from the middle portion 604) at a forward bend point 603 upon impact at a direction D2 (FIG. 6, bend point 603') that is angled with respect to an impact direction 202.

In embodiments, the bendline structures allow for buckling and include gaps and bendline geometries that are adaptable to allow for a tuning of impact timing and a controlled distribution of energy absorption by the bracket (i.e., the energy absorber structure 300) during deformation and/or impact. For example, bracket may be designed to buckle at a certain load, at which point outer deformation portions of the bracket (i.e., the front and rear portions 602, 606 of FIG. 4) buckle outwardly (i.e., as shown by front and rear portions 602', 606' of FIG. 6) and away from deformed middle portion 604'.

Figure 7A:
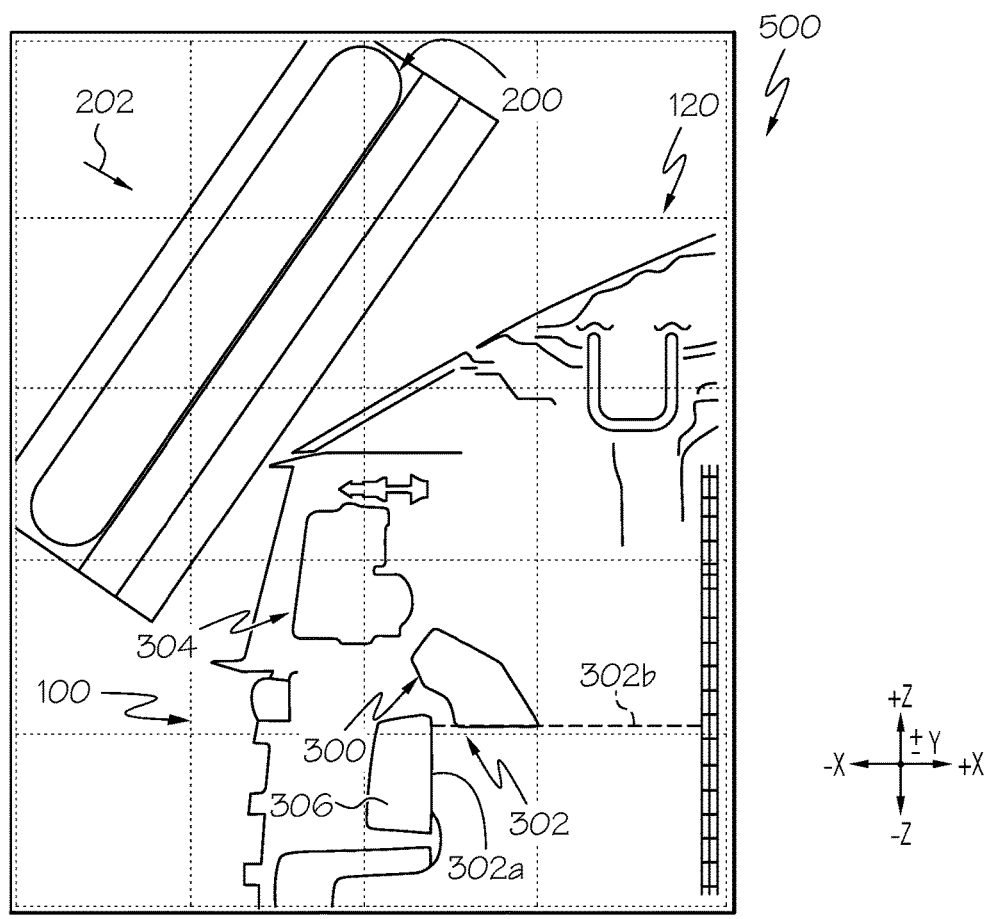
FIG. 7A schematically depicts another cross-section of a side view of the front bumper assembly and the exemplary impactor of FIG. 2, prior to impact with the front hood assembly, according to one or more embodiments shown and described herein.
Figures 7B, 7C:
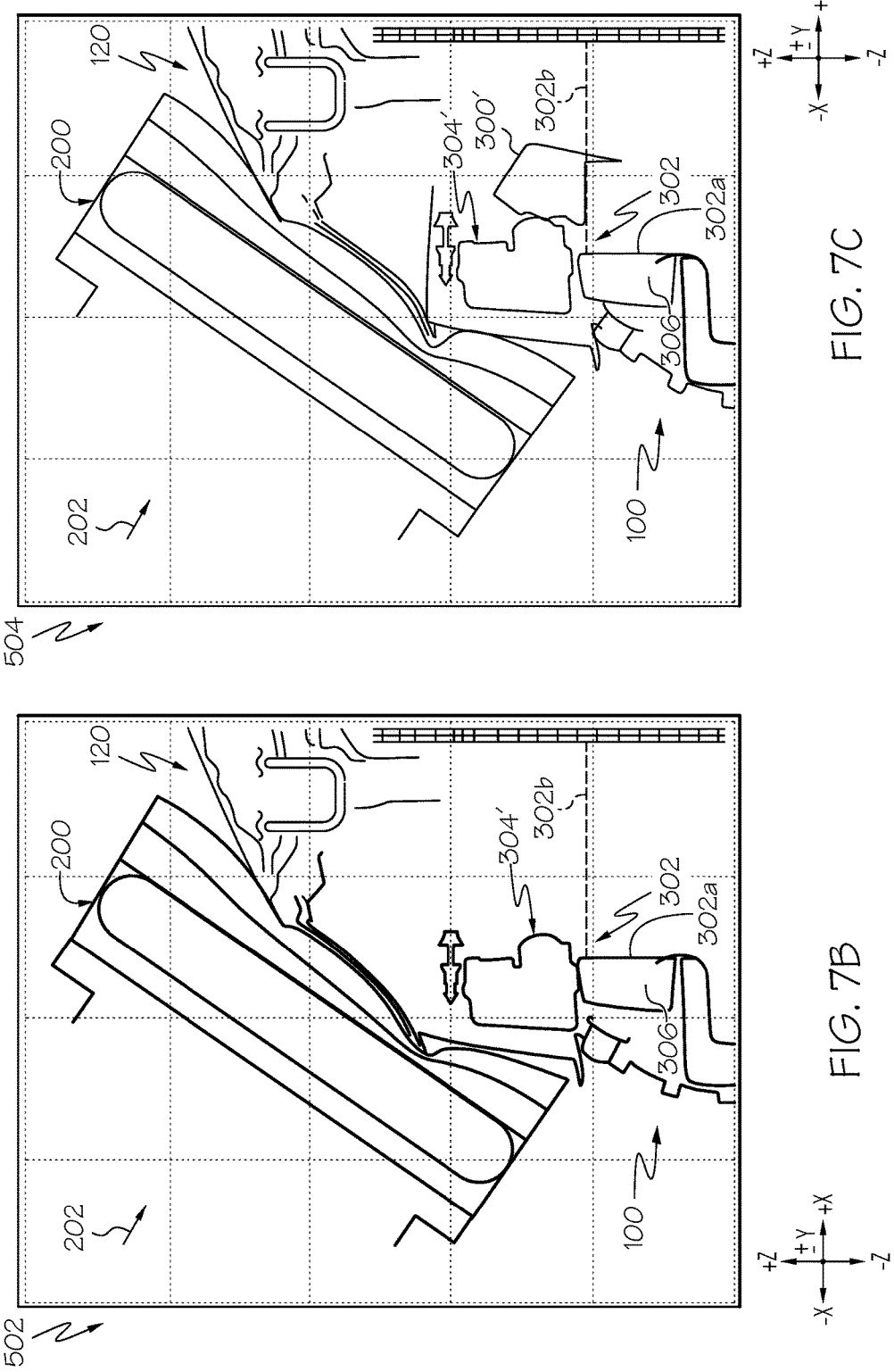
FIG. 7B schematically depicts the cross-section of the side view of the front hood assembly and the exemplary impactor of FIG. 2, after impact with the front hood assembly, in a scenario that does not include an exemplary deformable absorber structure, according to one or more embodiments shown and described herein.
FIG. 7C schematically depicts the cross-section of the side view of the front hood assembly and the exemplary impactor of FIG. 2, after impact with the front hood assembly in a scenario that includes the exemplary deformable absorber structure of FIG. 6, according to one or more embodiments shown and described herein.

Referring to FIGS. 7A-7C, examples of pre-impact and impact scenarios are shown. As similarly shown in FIG. 3 as described above, the front hood assembly 120 includes a sensory assembly 304, and the bumper assembly 100 includes the bumper reinforcement 302 and the foam component 306. For example, FIG. 7A schematically depicts another cross-section of an elevation view of the front hood assembly 120 and the impactor 200 prior to impact with the front hood assembly 120. In embodiments, each square of the respective grids 500, 502, 504 of FIGS. 7A-7C represent 100 mm by 100 mm squares. For example, the grid 500 of FIG. 7A is 500 mm in the vertical direction (y-axis) by 400 mm in the length direction (x-axis). Thus, in embodiments, in an undeformed state, the energy absorber structure 300 may be about 50 mm in height (in the vertical direction) and have a length between outermost points of about 75 mm and a length between bottom end leg structures of about 50 mm. In embodiments, the sensory assembly may have a height by length dimension of about 50 mm by 50 mm.

Illustrating a scenario in which the front hood assembly 120 does not include an exemplary deformable energy absorber structure 300, FIG. 7B schematically depicts the cross-section of the side view of the front hood assembly 120 and the impactor 200 after impact with the front hood assembly 120. With such an impact, the sensory assembly 304' is driven into an underlying structure such as the foam component 306 of the bumper reinforcement 302, and/or the sensory assembly 304' may be driven directly into a structure such as the bumper reinforcement 302.

Alternatively, illustrating a scenario in which the front hood assembly 120 includes an energy absorber structure 300", FIG. 7C schematically depicts the cross-section of the elevation view of the front hood assembly 120 and the impactor 200 after impact with the front hood assembly 120. With such an impact, rather than being driven directly into the foam component 306 and/or the bumper reinforcement 302, the sensory assembly 304' is driven into the energy absorber structure 300'. The energy absorber structure 300' absorbs energy from the sensory assembly 304' and deforms in a rearward direction away from the sensory assembly 304' and along the impact direction 202, for example.

Figure 8A:
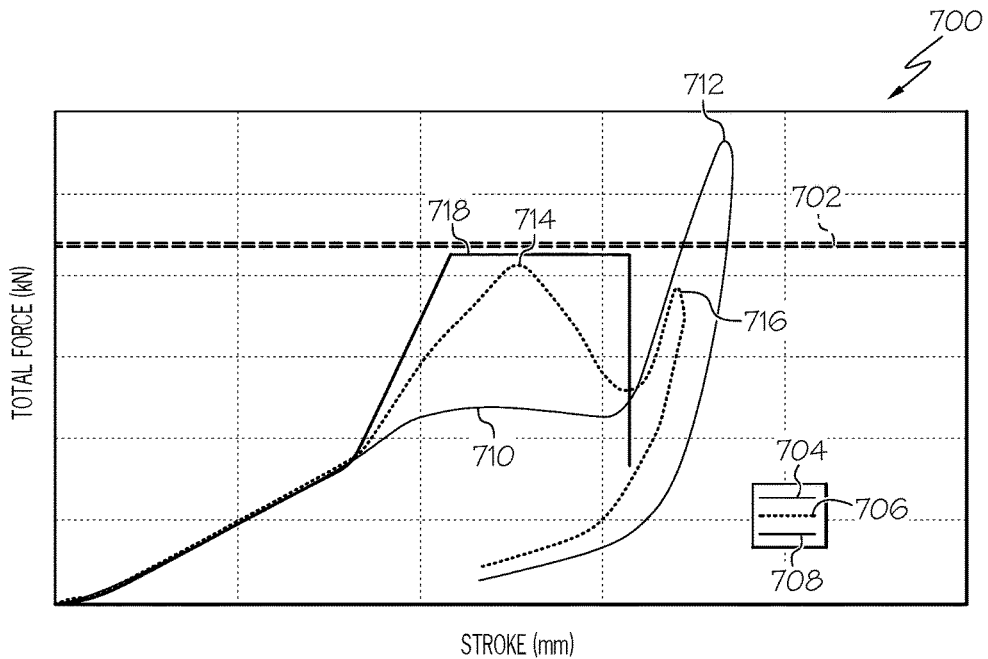
FIG. 8A graphically depicts impact force measurement comparisons based on the presence or lack of an exemplary deformable absorber structure, according to one or more embodiments shown and described herein.
Figure 8B:
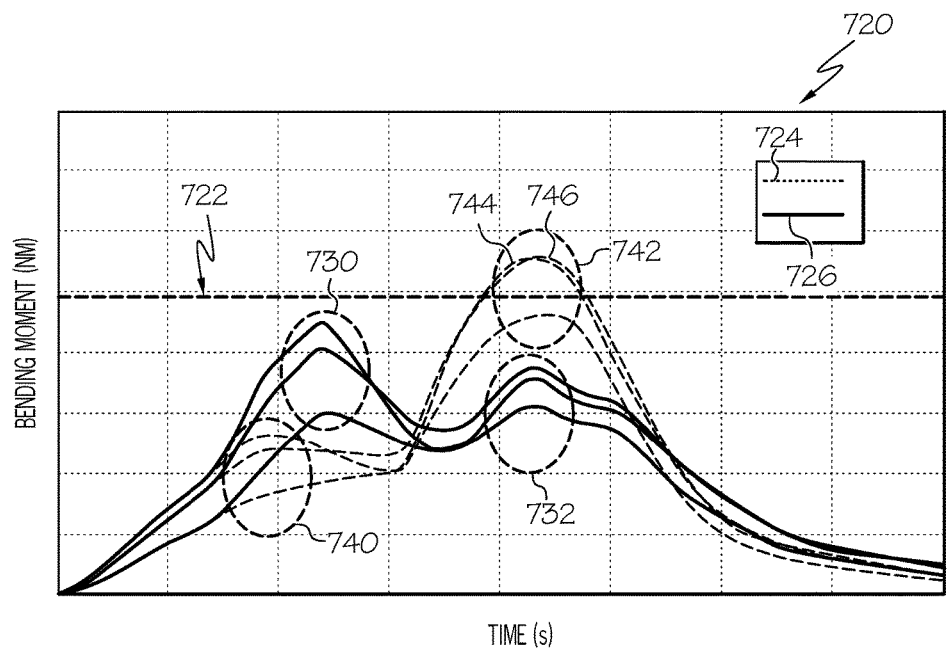
FIG. 8B graphically depicts bending moment measurement comparisons based on the presence or lack of an exemplary deformable absorber structure, according to one or more embodiments shown and described herein.

Examples of a tuning of energy distribution over an impact time period with respect to load and bending moment measurements of the impactor 200 are shown respectively in FIGS. 8A-8B. Referring to FIGS. 7A-8B, the time of impact may be, for example, in a range of from about 15 ms to 30 ms, and may also be accounted for by a stroke (mm) of the impactor 200. During the impact period, an energy distribution occurs that affects total load or force (measured in kN on the y-axis of the chart of FIG. 8A) and bending moment (measured in Nm on the y-axis of the chart of FIG. 8B) with respect to the impactor 200 during testing and an impact period. In embodiments, the respective energy distributions are functions of mass and velocity of the impactor 200.

FIG. 8A illustrates a chart 700 including a load threshold 702 and three separate scenarios represented by lines 704, 706, and 708. In embodiments, the load threshold is in a range of from about 5 kN to about 6 kN. In all three scenarios, the total amount of energy created by the impact remains the same but is distributed differently across the impact time period per scenario. For example, line 704 of FIG. 8A represents the scenario of FIG. 7B, in which scenario an energy absorber structure 300' is not present. A measured load increases to a first plateau area 710, peaks to a point 712 (i.e., upon the impact between the sensory assembly 304 and the bumper reinforcement 302 as shown in FIG. 5B), and then drops as the impact ends. The point 712 of FIG. 8A is shown as a hard spike that is above the load threshold 702. Thus, line 704 illustrates a scenario in which a positive acceleration of the impactor 200 may occur, affecting absorption of impact energy through a reduction of local deformation along the front hood assembly 120.

Alternatively, the scenario of FIG. 7C, in which an energy absorber structure 300' is present, is represented by line 706 of FIG. 8A. A measured load increases to a first peak 714 at which point the sensory assembly 304' impacts the energy absorber structure 300', which absorbs energy causes a reduction in load, and then increases to a second peak 716 (i.e., upon impact of a portion of the sensory assembly 304 with a portion of the bumper reinforcement 302), dropping as the impact ends. Both peaks 714, 716 of line 706, however, remain below the load threshold 702. Thus, line 706 illustrates a scenario in which a increased negative acceleration of the impactor 200 may occur, affecting absorption of impact energy through less of a reduction of local deformation along the front hood assembly 120 than would occur without the energy absorber structure 300' (as shown by line 704).

Additionally, a steady absorption impact scenario with the presence of an energy absorber structure 300' is represented by line 708 of FIG. 8A. With respect to the steady absorption scenario, the sensory assembly 304 does not undergo a contact with an underlying structure, and the energy absorber structure 300", 600 absorbs a steady stream of energy until the impact is complete. Thus, line 708 also illustrates a scenario in which a increased negative acceleration of the impactor 200 may occur, affecting absorption of impact energy through less of a reduction of local deformation along the front hood assembly 120 than would occur without the energy absorber structure 300' (as shown by line 704).

Similarly, FIG. 8B graphically depicts bending moment measurement comparisons with respect to the impactor 200, for example, that are based on the presence or lack of an energy absorber structure 300'. FIG. 8B illustrates a chart 720 including a bending moment threshold 722 and separate scenarios represented by lines 724, 726. In embodiments, the bending moment threshold 722 is in a range of from about 285 Nm to about 350 Nm.

The dashed line 724 represents three samples readings for a first scenario in which an energy absorber structure 300' is not present, as shown in the scenario of FIG. 7B. An area 740 illustrates a first set of peaks during the impact, and an area 742 illustrates a second set of peaks during the impact that occurs, for example, upon an impact of the sensory assembly 304' of FIG. 7B with the foam component 306 and/or the bumper reinforcement 302. For two of those sample readings within the area 742, as indicated by the peaks at points 744, 746, the bending moment threshold 722 is crossed during, for example, the hard impact of the sensory assembly 304' of FIG. 7B with the bumper reinforcement 302. Thus, line 724 illustrates a scenario in which a positive acceleration of the impactor 200 may occur, affecting absorption of impact energy through a reduction of local deformation along the front hood assembly 120.

The solid line 726 represents three sample readings for a second scenario in which an energy absorber structure 300' is present, as is shown in FIG. 7C. All of these sample readings remain below the bending moment threshold 722, both at a first peak area 730 (where, for example, the sensory assembly 304 impacts the energy absorber structure 300') and at a second peak area 732. The second peak area 732 may correspond to, for example, an impact of a portion of the sensory assembly 304 with a portion of the foam component 306 and/or the bumper reinforcement 302. Thus, line 726 illustrates a scenario in which a increased negative acceleration of the impactor 200 may occur, affecting absorption of impact energy through less of a reduction of local deformation along the front hood assembly 120 than would occur without the energy absorber structure 300' (as shown by line 724).

Thus, in embodiments, contacts between sensory assembly(s) 304 and structural components within the vehicle 10 (such as with the bumper reinforcement 302 of the bumper assembly 100) may cause a large spike with respect to force/load on, as well as to bending moment upon, the impactor 200 such that the energy distribution during impact surpasses respective thresholds. For example, spiked portions of such load and/or bending moment values that pass the respective thresholds indicate a potential increase in positive and a reduction of a local deformation of the front hood assembly 120 during impact. Such contacts may occur at, for example, an ending of a impact event resulting in a sharp spike, and the bending and load values may continue to increase until a remainder of the energy of the impactor 200 has been absorbed, at which point the values suddenly drop. A reduction of the spiked value is desirable, especially such that any peak values of energy distribution during impact with respect to load and/or bending moment remain below respective load and bending moment thresholds. The energy absorber structures described herein allow for control of energy absorption of impact energy throughout and during the impact to allow the impact energy to be fully absorbed prior to any hard contact that would otherwise pass a respective load and/or bending moment threshold.

It should now be understood that the embodiments described herein provide for a bumper assembly which includes a bumper reinforcement on which an energy absorber structure is positioned to absorb energy from an impact of a sensory assembly disposed forward of and above the energy absorber structure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A front hood assembly for a vehicle including a front grille, the front hood assembly comprising:
a sensory assembly;
a bumper assembly positioned adjacent to the front grille, wherein:
the bumper assembly includes a bumper reinforcement having a front face and a top face, and
the front face is disposed below and extends away from the top face; and
an energy absorber structure positioned adjacent to the top face of the bumper reinforcement, wherein:
the energy absorber structure is rearwardly compliant in an impact direction, and
the energy absorber structure is disposed below and rearwardly of the sensory assembly such that an impact of the sensory assembly with the energy absorber structure in the impact direction collapses the energy absorber structure rearwardly.

2. The front hood assembly of claim 1, wherein the impact direction is disposed at approximately a 45° angle with respect to a portion of the top face of the bumper reinforcement.

3. The front hood assembly of claim 1, wherein the sensory assembly comprises a radar sensor configured to generate an object sensing signal to prevent crashes.

4. The front hood assembly of claim 1, wherein the sensory assembly comprises a radar sensor configured to generate a control signal to assist with dynamic cruise control operations.

5. The front hood assembly of claim 1, wherein the energy absorber structure is formed from an injection moldable material.

6. The front hood assembly of claim 1, wherein:
the energy absorber structure comprises:
a front portion, a middle portion, and rear portion, and
one or more bendline structures in the rear portion, wherein:
each bendline structure is defined by a pair of legs defining a gap therebetween, and
the pair of legs are configured to bend at a rearward bend point upon impact at a direction that is rearwardly angled with respect to the impact direction.

7. The front hood assembly of claim 1, wherein, during the impact, a bending moment remains below a bending moment threshold that is in a range of from about 285 Nm to about 350 Nm.

8. The front hood assembly of claim 1, wherein, during the impact, a load remains below a load threshold that is in a range of from about 5 kN to about 6 kN.

9. A vehicle comprising:
a front hood assembly comprising a sensory assembly;
a bumper assembly, wherein:
the bumper assembly includes a bumper reinforcement having a front face and a top face, and
the front face is disposed below and extends away from the top face; and an energy absorber structure positioned adjacent to the top face of the bumper reinforcement, wherein:
the energy absorber structure is rearwardly compliant in an impact direction, and
the energy absorber structure is disposed below and rearwardly of the sensory assembly such that an impact of the sensory assembly with the energy absorber structure in the impact direction collapses the energy absorber structure rearwardly.

10. The vehicle of claim 9, wherein the impact direction is disposed at approximately a 45° angle with respect to a portion of the top face of the bumper reinforcement.

11. The vehicle of claim 9, wherein the sensory assembly comprises a radar sensor configured to generate at least one object sensing signals to prevent crashes and control signals to assist with dynamic cruise control operations.

12. The vehicle of claim 9, wherein:
the energy absorber structure is made of one of metal, plastic, or combinations thereof.

13. The vehicle of claim 9, wherein:
the energy absorber structure comprises:
a front portion, a middle portion, and rear portion, and
one or more bendline structures in the rear portion, wherein:
each bendline structure is defined by a pair of legs defining a gap therebetween, and
the pair of legs are configured to bend at a rearward bend point upon impact at a direction that is rearwardly angled with respect to the impact direction.

14. The vehicle of claim 9, wherein, during the impact, a bending moment remains below a bending moment threshold that is in a range of from about 285 Nm to about 350 Nm.

15. The vehicle of claim 9, wherein, during the impact, a load remains below a load threshold that is in a range of from about 5 kN to about 6 kN.

16. An energy absorber structure for a bumper assembly of a vehicle, the energy absorber structure comprising:
an injection moldable material, wherein the energy absorber structure is formed from the injection moldable material;
a front portion, a middle portion, and rear portion; and
one or more bendline structures in the rear portion, wherein each bendline structure is defined by a pair of legs defining a gap therebetween, wherein the pair of legs are configured to bend rearwardly at a rearward bend point upon impact at a direction that is angled with respect to an impact direction, and wherein the pair of legs are angled in a same direction to bend at the rearward bend point in the same direction.

17. The energy absorber structure of claim 16, wherein the energy absorber structure is positioned adjacent to a top face of a bumper reinforcement of the bumper assembly.

18. The energy absorber structure of claim 16, wherein the energy absorber structure is disposed below and rearwardly of a sensory assembly such that an impact of the sensory assembly with the energy absorber structure in the impact direction collapses the energy absorber structure rearwardly.

19. The energy absorber structure of claim 16, wherein:
the energy absorber structure is a bracket, and
the injection moldable material is an injection moldable polymer material.

20. The energy absorber structure of claim 16, further comprising one or more bendline structures in the front portion, wherein each bendline structure is defined by a pair of legs defining a gap therebetween, wherein the pair of legs are configured to bend forwardly at a forward bend point upon impact at a direction that is angled with respect to the impact direction.

* * * * *

UNITED STATES PATENT AND TRADEMARK OFFICE
CERTIFICATE OF CORRECTION

PATENT NO. : 9,855,914 B1  
APPLICATION NO. : 15/205208  
DATED : January 2, 2018  
INVENTOR(S) : Jeremiah T. Hammer et al.

It is certified that error appears in the above-identified patent and that said Letters Patent is hereby corrected as shown below:

In the Specification

In Column 4, Line 13, after "angle of impact", delete "a" and insert --α--, therefor.

In Column 4, Line 15, after "angle of impact", delete "a" and insert --α--, therefor.

Signed and Sealed this  
Tenth Day of July, 2018

Andrei Iancu  
*Director of the United States Patent and Trademark Office*